United States Patent Office 2,743,285
Patented Apr. 24, 1956

2,743,285

WATER-MISCIBLE GLYCIDYL ETHERS

Benjamin G. Wilkes, Jr., Wilkinsburg, and Arthur B. Steele, Pittsburgh, Pa., assignors to Union Carbide and Carbon Corporation, a corporation of New York No Drawing. Application December 20, 1951, Serial No. 262,674

4 Claims. (Cl. 260—348)

The present discovery relates to glycidyl ethers. More particularly, it is concerned with new and improved glycidyl ethers which are miscible with water in all proportions and capable of imparting a high degree of water-miscibility to hydrophobic structures containing an active hydrogen.

The glycidyl ethers of polyphenols are known (Bender, et al. Patent 2,506,486). They are viscous to solid materials, insoluble in water, and convert to solid, infusible masses. The glycidyl ethers of aliphatic polyhydric alcohols likewise are known (Bixler, 2,512,996). They also have from but limited to no miscibility with water, and likewise convert to solid, insoluble masses (see Table II). Still other known epoxide compositions, not glycidyl ethers, are the epoxide ethers of lower alkanols in which the epoxide group contains five carbon atoms as contrasted with the three-carbon-atom radical, glycidyl (Cahnmann et al. 2,501,026). These epoxide ethers are characterized by limited miscibility with water, both monomer and polymer. To structures capable of reacting therewith, they impart a strong organophilic property in contrast to the strong hydrophilic characteristics imparted by the glycidyl ethers of this invention.

The present improvement is based on our discovery that the glycidyl ethers of the monomethyl ethers of diethylene glycol, dipropylene glycol and ethylene propylene diglycol, $HOC_2H_4OC_2H_3(CH_3)OH$, are miscible with water in all proportions and capable of imparting a high degree of water miscibility to hydrophobic structures containing an active hydrogen, with resultant production of surface active agents. In addition, these glycidyl ethers which have eight, nine or ten carbon atoms to the molecule convert to polymers which are miscible with water in all proportions. The monomers can be represented by the following general formula

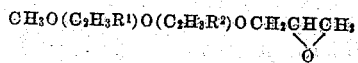

in which $R^1$ and $R^2$ are hydrogen or methyl. The boiling temperatures and water-miscibility of these glycidyl ethers are listed in the following table:

TABLE I

| Glycidyl ether of— | Boiling Temp. at 3 mm., °C. | Water-Miscibility at 25° C. | | Carbon Factor[1] |
|---|---|---|---|---|
| | | Monomer | Polymer | |
| diethylene glycol monomethyl ether | 90–93 | ∞ | ∞ | 5 |
| dipropylene glycol monomethyl ether | 83–91 | ∞ | ∞ | 7 |
| ethylene, propylene diglycol, monomethyl ether | 88–91 | ∞ | ∞ | 6 |

[1] Carbon factor: Number of carbon atoms per oxirane group in the monomer, exclusive of the glycidyl group or groups.

As will be noted, these glycidyl ethers combine in the same molecule the properties of water miscibility and high boiling temperature. By the term high boiling temperature, as used herein, is meant a boiling temperature at a reduced pressure of three millimeters of mercury absolute of at least 80° C. with correspondingly higher boiling temperature at higher pressures. By reason of the high boiling temperature and miscibility of the monomers and polymers with water in all proportions taken together with their reactivity through the oxirane group,

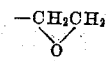

present therein, these glycidyl ethers of the diglycol monomethyl ethers are useful and important as solubilizing agents, as polymerizable resin solvents, and as intermediates for chemical synthesis generally. The oxirane group is reactive wtih compounds containing active hydrogen atoms, for instance, alcohols, phenols, amines, acids and the like. Thus, in reaction with lauryl alcohol the glycidyl ether of diethylene glycol monomethyl ether is approximately equivalent to ethylene oxide as a solubilizing agent but because of its high boiling temperature and high flash point it can be used with few of the hazards attendant upon reactions where ethylene oxide is used. Also, pressure equipment is not required for glycidyl ether conversions, or storage, as with ethylene oxide. The same is true also of the glycidyl ethers of dipropylene glycol monomethyl ether and of ethylene propylene diglycol monomethyl ether. Our glycidyl ethers are also excellent solvents for nitrocellulose and can be used as polymerizable solvents in fluid epoxy resin systems.

In contrast to the monoglycidyl ethers of the diglycol monomethyl ethers of the present invention are the monoglycidyl and diglycidyl ethers of the various glycols whose properties are given in the following table. They are not a part of this invention.

TABLE II

| | Boiling Temp. at 3 mm., °C. | Water-Miscibility at 25° C. | | Carbon Factor[1] |
|---|---|---|---|---|
| | | Monomer | Polymer | |
| Monoglycidyl ether of: | | | | |
| ethylene glycol | 84–86 | ∞ | limited | 2 |
| propanediol-1,3 | 100–103 | ∞ | do | 3 |
| butanediol-1,4 | 118–122 | ∞ | do | 4 |
| pentanediol-1,5 | 131–135 | ∞ | do | 5 |
| hexanediol-1,6 | 140–142 | ∞ | do | 6 |
| ethylene glycol monomethyl ether | 57–60 | ∞ | ∞ | 3 |
| propylene glycol monomethyl ether | 51–56 | ∞ | ∞ | 4 |
| Diglycidyl ether of: | | | | |
| ethylene glycol | 139–142 | ∞ | limited | 1 |
| propanediol-1,3 | 155–158 | ∞ | do | 1.5 |
| butanediol-1,4 | 170–173 | limited | do | 2 |
| pentanediol-1,5 | 182–185 | do | do | 2.5 |
| hexanediol-1,6 | 190–195 | do | do | 3 |

[1] Carbon factor: Number of carbon atoms per oxirane group in the monomer exclusive of the glycidyl groups.

With respect to the diglycidyl ethers of the glycols, it appears from the data of the foregoing table that the number of carbon atoms in the glycol residue is the critical factor in determining water-miscibility of the monomer, and that when the number of carbon atoms in the glycol residue (i. e., the molecule exclusive of the glycidyl groups) exceeds two per glycidyl group, the monomer is not miscible with water. This observation seems to be borne out by a comparison of the water-miscibility of glycidyl ethers which have in the monomer residue (exclusive of the glycidyl groups) more than two carbon atoms per glycidyl group.

TABLE III

| Monomer | Water-Miscibility at 25° C. | | Carbon Factor [1] |
|---|---|---|---|
| | Monomer | Polymer | |
| n-amyl glycidyl ether | limited | limited | 5 |
| 3-methyl butyl glycidyl ether | ---do--- | ---do--- | 5 |
| diglycidyl ether of decamethylene glycol | ---do--- | ---do--- | 5 |
| monoglycidyl ether of diethylene glycol monomethyl ether | ∞ | ∞ | 5 |

[1] Carbon factor: The number of carbon atoms in the monomer, exclusive of glycidyl groups, per glycidyl group.

In contrast to the foregoing, the monomers of the glycidyl ethers of the diglycol monomethyl ethers of this invention remain miscible with water in all proportions when the number of carbon atoms in the molecule, exclusive of the glycidyl group, is as high as seven per glycidyl group, as in the case of the glycidyl, methyl diether of dipropylene glycol.

From Table II, it is to be noted that none of the lower aliphatic glycidyl ethers, excepting the glycidyl ethers of ethylene and propylene glycol monomethyl ethers convert to polymers miscible with water in all proportions. These two diglycidyl ethers are not capable, however, of imparting water-miscibility to hydrophobic structures to the high degree which characterizes the compounds of this invention.

Concerning the relative efficiencies of these epoxides for converting commercial lauryl alcohol to water soluble derivatives possessing surface-activity in water solution, the following weights of monomer are required to impart equivalent water solubility to 190 grams of the alcohol in the production of nonionic ether derivatives:

481 grams glycidyl ether of ethylene glycol monomethyl ether 415 grams glycidyl ether of diethylene glycol monomethyl ether 390 grams ethylene oxide Draves' wetting tests indicate that the surface-active agent derived from the glycidyl ether of diethylene glycol monomethyl ether is superior in wetting power to that derived from the glycidyl ether of ethylene glycol monomethyl ether. The data appears in the following table:

TABLE IV

*Concentrations of solubilized lauryl alcohol in grams per 100 milliliters of distilled water for various wetting times in Draves' wetting tests*

| Lauryl Alcohol Solubilized with— | Wetting Times | | |
|---|---|---|---|
| | 10 seconds | 20 seconds | 30 seconds |
| Glycidyl ether of ethylene glycol monomethyl ether_____Grams per 100 ml__ | 0.125 | 0.077 | 0.061 |
| Glycidyl ether of diethylene glycol monomethyl ether_____Grams per 100 ml__ | 0.105 | 0.066 | 0.047 |
| Ethylene oxide_____do____ | 0.11 | 0.086 | 0.045 |

Our glycidyl ethers can be prepared by reacting epichlorhydrin with the diglycol monomethyl ether in the presence of a suitable catalyst, for instance, boron trifluoride. The epichlorhydrin is preferably added to the diglycol monomethyl ether, dropwise. Upon completion of the reaction, the resulting alpha-glycerol chlorhydrin ether is then reacted with an equivalent amount of alkali to dehydrochlorinate it. The resultant glycidyl ether can then be recovered and purified, if need be.

The improvement is further illustrated by the following examples.

EXAMPLE 1

Glycidyl ether of methoxyethoxyethanol

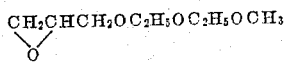

To 960 parts (8 mols) of diethylene glycol monomethyl ether containing as catalyst one milliliter of the etherate of boron trifluoride was added dropwise 185 parts (2 mols) of epichlorhydrin. The reaction mixture was maintained at a temperature of 75° to 85° C. After all the epichlorhydrin had been added and the exothermic reaction had subsided, the temperature was raised to 100° C. to insure complete reaction. The reaction mixture was then distilled. After recovering the unreacted diethylene glycol monomethyl ether, there was obtained 383 parts of the alpha-glyceryl chlorhydrin ether of diethylene glycol monomethyl ether. This amount represented a yield of 90 per cent.

A mixture of 383 parts (1.8 mols) of the alpha-glycerol chlorhydrin ether of diethylene glycol monomethyl ether with an equal amount of diethyl ether was cooled to 10° C. and 72 parts of sodium hydroxide in the form of a 50 per cent aqueous concentrate was added at a uniform rate over a period of one hour. Thereafter the temperature was raised to 100° C. over a period of two hours. By titration it was ascertained that 95 per cent of the sodium hydroxide had been used in the dehydrochlorination reaction. After the reaction mixture had been filtered to remove the salt, the ether layer was separated and dried over sodium sulfate. Upon distillation, there was obtained 260 parts of the glycidyl ether of diethylene glycol monomethyl ether representing a yield of 82 per cent. It was a colorless liquid which was miscible in all proportions with water. It was characterized by the following properties: boiling temperature, 95°–97° C. at 4 millimeters of mercury, pressure, abs.; refractive index, $n_D^{24°\ C.}$, 1.4350; specific gravity, 24/20° C., acid acceptor value (pyridine hydrochloride method) 94.1 per cent; molar refraction, 43.77, calculated, 43.60 found.

| Analysis | Found | Calculated for $C_8H_{16}O_4$ |
|---|---|---|
| Carbon, percent | 53.6 | 54.4 |
| Hydrogen, percent | 9.0 | 9.07 |

EXAMPLE 2

Glycidyl ether of dipropylene glycol monomethyl ether

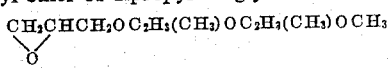

A run was made similar to that of Example 1 with 1480 parts (10 mols) of the methyl ether of diethylene glycol substituted for the methyl ether of propylene glycol. The dipropylene glycol monomethyl ether was a mixture of isomers resulting from the reaction of two mols of propylene oxide with one mol of methanol. There was obtained 535 parts of the alpha-glyceryl chlorhydrin ether of dipropylene glycol monomethyl ether, representing a yield of 74 per cent of theory. It boiled at a temperature of 125°–136° C. at a pressure of two millimeters of mercury, abs.

The alpha-glyceryl chlorhydrin ether of dipropylene glycol monomethyl ether thus obtained (535 parts, 2.22 mols) was dehydrochlorinated according to the procedure employed in Example 1, using for this purpose 88.8 parts (2.22 mols) of sodium hydroxide in the form of a 50 per cent aqueous concentrate. There was obtained 408 parts of the glycidyl ether of the methyl ether of dipropylene glycol, which represented a yield of 90 per cent of theory. The product was a colorless, limpid liquid that was miscible with water in all proportions. It was characterized by the following properties: boiling temperature, 83° to 91° C. at a pressure of 3 millimeters of mercury, abs.; specific gravity 24/20° C., 1.0010; refractive index, $n_D^{24°C.}$, 1.4313; and acceptor value (pyridine hydrochloride method) 94.9 per cent; molar refraction, 53.006 calculated; 52.81 found.

| Analysis | Found | Calculated for $C_{10}H_{20}O_4$ |
|---|---|---|
| Carbon, percent | 58.8 | 58.87 |
| Hydrogen, percent | 9.8 | 9.80 |

This application is in part a continuation of our application filed January 19, 1951, Serial No. 206,908.

We claim:

1. Water-miscible glycidyl ethers of the monomethyl ether of diglycols in which the total number of carbon atoms in the molecule is from eight to ten with from two to three carbon atoms to each glycol radical thereof.

2. Water-miscible glycidyl ethers which convert on polymerization to water-miscible polymers, said ethers being of the general formula

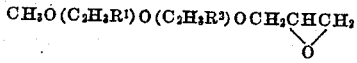

in which $R^1$ and $R^2$ are of the group consisting of hydrogen and methyl.

3. The methyl, glycidyl diether of diethylene glycol.
4. The methyl, glycidyl diether of dipropylene glycol.

References Cited in the file of this patent
UNITED STATES PATENTS

| 2,484,370 | Ballard | Oct. 11, 1949 |
| 2,581,464 | Zech | Jan. 8, 1952 |
| 2,637,713 | Suen | May 5, 1953 |